Aug. 8, 1933.  A. V. ANDERSON  1,920,961
METHOD OF MAKING INFLATABLE ARTICLES
Filed Dec. 20, 1929

INVENTOR
Axel V. Anderson
BY
Marshall & Hawley.
ATTORNEYS

Patented Aug. 8, 1933

1,920,961

UNITED STATES PATENT OFFICE 1,920,961

METHOD OF MAKING INFLATABLE ARTICLES

Axel V. Anderson, Beacon, N. Y., assignor to New York Rubber Corporation, New York, N. Y., a Corporation of New York Application December 20, 1929. Serial No. 415,381

5 Claims. (Cl. 154—42)

This invention relates to inflatable articles such, for instance, as pneumatic mattresses, pillows, cushions or like articles.

Articles of the character described, and particularly mattresses and cushions, are commonly formed of fabric sheets having rubber linings and in order to give shape to the articles and to prevent bulging thereof from edge to edge, portions of the covers or sides of the article between the edges are connected. This form of construction is illustrated for example in Patent No. 1,625,582, granted April 19, 1927.

A construction such as that shown in the patent is not objectionable for small articles but does possess certain disadvantages when used for larger articles, such as mattresses. For instance, it will be obvious that connections between the covers or sides of an article, such as a mattress, on a plurality of longitudinal lines will form a plurality of relatively deep hollows or depressions extending lengthwise of the mattress. Furthermore, such connections take up or use up a very considerable amount of the material of the sides or covers, thus cutting down the width of the article that can be made from sheets of material of predetermined dimensions.

This application has for its object to provide an inflatable article so constructed that an article of maximum width will be obtained for the size of sheets or covers used.

Another object of the invention is to provide a simple, practical and inexpensive method of making inflatable articles having members or webs therein connecting and spacing the covers or sides of the article.

Another object of the invention is to provide a method of making inflatable hollow articles, so constructed that the sides or covers of the article will be held in spaced relation at a plurality of points or on a plurality of lines.

Another object of the invention is to provide simple and practical apparatus for carrying out the method outlined and for producing an article having the characteristics set forth.

Further objects of the invention will appear from the following specification taken in connection with the drawing, which forms a part of this application, and in which Fig. 1 is a sectional elevation, somewhat diagrammatic, showing a portion of a press and illustrating the method of making inflatable articles;

The invention briefly described consists primarily of a method of making inflatable articles and in carrying out the method sheets of material, such as cloth or fabric having faces of uncured or unvulcanized rubber, are superimposed with the uncured rubber faces in contact with each other. Members formed of flexible material having uncured rubber portions are interposed at spaced intervals between the uncured faces of the sheets of material, and pressure, preferably accompanied by heat, is applied to the sheets of material thus joining the sheets around their outer edges and securely joining the spacing members between the sheets to the inner surfaces of the sheets. If relatively heavy pressure and a vulcanizing heat are applied either simultaneously or in sequence, the joints between the outer periphery or edges of the sheets and between the spacing members and the sheets will be vulcanized. Furthermore, the pressure with the heat will cause portions of the uncured rubber at the points of pressure to be extruded, forming fillets or beads which reinforce the joint. The interposed spacing members may take the form of tubular members having uncured rubber outer surfaces, the inner surfaces of the tubular members being formed of fabric or cloth. On the other hand, if desired, the spacing members may take the form of folded strips of material having uncured rubber outer portions to which the pressure is applied.

Further details of the invention will appear from the following description.

Figure 1:
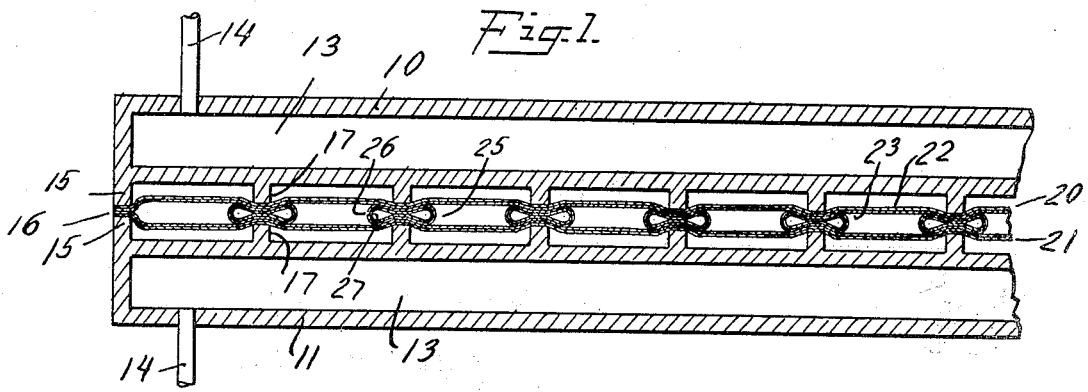
Figure 3:
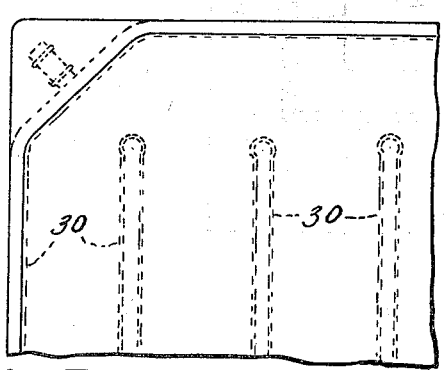
Fig. 3 is a top plan view, partly broken away, of an article, such as a mattress, made on the machine or press shown in Fig. 1.
Figure 4:
Fig. 4 is an enlarged sectional elevation showing the joints between the spacing member or web and one of the covers or sides of the article.
Figure 5:
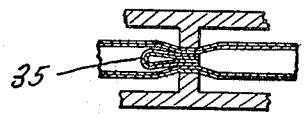
Fig. 5 is a fragmentary sectional elevation showing a portion of the press and a modified form of web for connecting the covers or sides of the article.

The method may be carried out for manufacturing any desired form or shape of inflatable article and in Figs. 1 and 3 there is illustrated one form of apparatus that may be utilized. Fig. 1 shows portions of a press comprising two sections 10 and 11 having chambers 13 therein for receiving a heating fluid which may be admitted through pipe 14. Each of the sections 10 and 11 of the press has formed at its outer periphery, a rib or flange 15. These flanges are adapted to engage the outer edge portions 16 of the superimposed sheets of material and to press these portions tightly together.

Each section of the press also has formed therein a plurality of ribs or flanges 17, these ribs or flanges on one section of the press registering with the corresponding ribs or flanges on the other section. It will be noted that the ribs 17 are not as deep as the ribs 15.

In carrying out the method, two sheets 20 and 21 are superimposed on each other and each sheet has an outer layer 22 of cloth or fabric and an inner layer 23 of uncured or unvulcanized rubber. The uncured layers 23 are disposed face to face.

In order to space and secure the sheets in spaced relation, a plurality of tubular members 25 are interposed between the uncured rubber surfaces or faces. Each of these members has its outer surface or layer 26 formed of uncured or unvulcanized rubber and has an inner layer or surface 27, preferably formed of cloth or fabric. The tubular members 25 are spaced between the sheets 20 and 21 at the desired intervals and in a mattress or like article the tubular members will preferably be disposed parallel to each other. Furthermore, the tubular members will be so spaced as to be positioned between the inwardly extending ribs or flanges 17.

Figure 2:
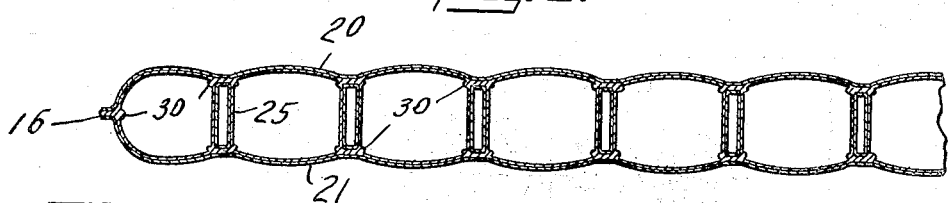
Fig. 2 is a sectional elevation showing one of the articles inflated.

After the sheets and interposed members have been disposed in the manner above set forth, the press is subjected to heavy pressure and also preferably to a vulcanizing heat. The pressure and heat effect the formation of the vulcanized joints between the tubular members 25 and the inner faces of the sheets 20 and 21, and also between the outer edge portions of the sheets. An article formed in the manner above set forth, when inflated, takes the form and shape illustrated in Fig. 2, wherein it will be seen that the sheets or sides of the article will be held in definite spaced relation to each other and that the objectionable longitudinal depressions or hollows which are present in the ordinary pneumatic mattress have been eliminated.

When the pressure and heat are applied, the uncured rubber at the junctions of the joined portions will be forced outwardly in the form of a fillet or bead 30, such beads being formed at the longitudinal joined edges of the sheets and the tubular members and also at the peripheral or outer edge portions of the sheets. This bead or fillet materially reinforces the joint.

Figure 6:
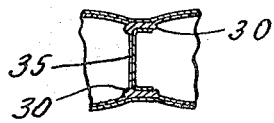
Fig. 6 is a sectional elevation showing a portion of the article inflated and having the covers connected by the form of connecting means shown in Fig. 5.

Instead of using tubular members such as those above described, the sides or covers of the inflatable article may be connected and held in spaced relation by means of strips 35 of material which are folded longitudinally and interposed between the uncured rubber faces of the sheets. These strips may be formed of cloth or fabric coated on one side with uncured rubber and the uncured rubber portions are positioned between the flanges or ribs 17 of the press. When pressure and heat are applied, a joint such as that shown in Fig. 6 will be formed, and the sheets will be held in spaced relation by means of the strips of material.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. The method of making inflatable articles which consists of superimposing sheets of fabric having inner faces of uncured rubber with said uncured rubber faces facing each other, interposing fabric members having uncured rubber outer portions engaging the uncured faces of said sheets and simultaneously applying pressure to the outer edges of said sheets and to the portions of the sheets alined with said members, thus uniting the outer edges of the sheets and the other portions of the sheets and members where pressure is applied.

2. The method of making inflatable articles which consists of superimposing sheets of material having faces of uncured rubber with said uncured rubber faces facing each other, interposing members having uncured rubber portions engaging the uncured faces of said sheets, thereby to join the sheets together and simultaneously applying pressure and heat to the outer edges of said sheets and to the portions of the sheets alined with said members, thus uniting and vulcanizing the outer edges of the sheets and the other portions of the sheets and members where pressure is applied.

3. The method of making inflatable articles which consists of superimposing sheets of fabric having inner faces of uncured rubber with said uncured rubber faces facing each other, interposing folded fabric members having uncured rubber outer portions engaging the uncured faces of said sheets and simultaneously applying pressure to the outer edges of said sheets and to the portions of the sheets alined with said members, thus uniting the outer edges of the sheets and the other portions of the sheets and members where pressure is applied.

4. The method of making inflatable articles which consists of superimposing sheets of fabric having inner faces of uncured rubber with said uncured rubber faces facing each other, interposing tubular fabric members having uncured rubber outer portions engaging the uncured faces of said sheets and simultaneously applying pressure to the outer edges of said sheets and to the portions of the sheets alined with said members, thus uniting the outer edges of the sheets and the other portions of the sheets and members where pressure is applied.

5. The method of making inflatable articles which consists of superimposing sheets of fabric having inner faces of uncured rubber with said uncured rubber faces facing each other, interposing elongated fabric members having outer portions engaging the uncured faces of said sheets and simultaneously applying pressure to the outer edges of said sheets and to the portions of the sheets alined with said members, thus uniting the outer edges of the sheets and the other portions of the sheets and members where pressure is applied.

AXEL V. ANDERSON.